US012012088B2

United States Patent
Ko

(10) Patent No.: US 12,012,088 B2
(45) Date of Patent: Jun. 18, 2024

(54) ELECTRIC BOOSTER BRAKE APPARATUS AND CONTROLLING METHOD THEREOF

(71) Applicant: HYUNDAI MOBIS CO., LTD., Seoul (KR)

(72) Inventor: Ji Weon Ko, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 349 days.

(21) Appl. No.: 17/489,857

(22) Filed: Sep. 30, 2021

(65) Prior Publication Data
US 2022/0314944 A1  Oct. 6, 2022

(30) Foreign Application Priority Data
Apr. 2, 2021  (KR) .................. 10-2021-0043290

(51) Int. Cl.
*B60T 8/32* (2006.01)
*B60T 7/04* (2006.01)
(Continued)

(52) U.S. Cl.
CPC .......... *B60T 8/3265* (2013.01); *B60T 7/042* (2013.01); *B60T 8/17551* (2013.01);
(Continued)

(58) Field of Classification Search
CPC .... B60T 8/3265; B60T 8/7551; B60T 8/3275; B60T 7/042; B60T 13/745; B60T 13/146; B60T 13/662; B60T 13/686
See application file for complete search history.

(56) References Cited

U.S. PATENT DOCUMENTS

2015/0035351 A1* 2/2015 Okano .................. B60T 13/12
                                                              303/10
2015/0217741 A1* 8/2015 Kikawa ................ B60T 13/146
                                                              701/71
(Continued)

FOREIGN PATENT DOCUMENTS

CN      107444381 A    12/2017
JP      2013086638 A    5/2013
(Continued)

OTHER PUBLICATIONS

Decision to Grant issued Apr. 10, 2023 in corresponding Korean patent application No. 10-2021-0043290.
(Continued)

*Primary Examiner* — George C Jin
(74) *Attorney, Agent, or Firm* — NovoTechIP International PLLC

(57) ABSTRACT

At least one embodiment of the present disclosure provides an electric booster brake apparatus including an electric booster unit, an electronic stability control (ESC) operating unit, and an electric-booster control unit. The electric booster unit has a motor, and a motor piston and a master cylinder and pressurizes the master cylinder by adjusting a displacement of the motor piston. The ESC operating unit includes a pressure sensor measuring pressure in the master cylinder and calculates a required braking pressure. The electric-booster control unit controls the position of the motor piston. The electric-booster control unit includes a feedforward control unit for converting the value of the required braking pressure into a motor piston displacement, and a feedback control unit for calculating a compensation displacement of the motor piston based on a difference between the value of the required braking pressure and the value of the pressure in the master cylinder.

12 Claims, 4 Drawing Sheets

(51) Int. Cl.
    *B60T 8/1755* (2006.01)
    *B60T 13/74* (2006.01)
    *B60T 17/22* (2006.01)
(52) U.S. Cl.
    CPC .......... *B60T 13/745* (2013.01); *B60T 17/221* (2013.01); *B60T 2220/04* (2013.01); *B60T 2270/30* (2013.01); *B60T 2270/82* (2013.01); *B60T 2270/88* (2013.01)

(56) References Cited

U.S. PATENT DOCUMENTS

| | | | |
|---|---|---|---|
| 2019/0217830 A1* | 7/2019 | Masuda | B60T 13/74 |
| 2020/0262409 A1 | 8/2020 | Takahashi et al. | |
| 2021/0053410 A1* | 2/2021 | Park | B60G 17/0195 |
| 2021/0078555 A1* | 3/2021 | Kim | B60T 13/142 |
| 2022/0314944 A1* | 10/2022 | Ko | B60T 7/122 |

FOREIGN PATENT DOCUMENTS

| | | | |
|---|---|---|---|
| KR | 1020150012339 A | 2/2015 | |
| KR | 102183953 B1 | 11/2020 | |
| WO | 2010121848 A1 | 10/2010 | |

OTHER PUBLICATIONS

Office Action dated May 31, 2023 in corresponding Chinese patent application No. 202111094062.X.
Office Action issued Jan. 31, 2024 in corresponding Chinese Patent Application No. 202111094062.X.

\* cited by examiner

ELECTRIC BOOSTER BRAKE APPARATUS AND CONTROLLING METHOD THEREOF

CROSS-REFERENCE TO RELATED APPLICATIONS

This application is based on, and claims priority from, Korean Patent Application Number 10-2021-0043290, filed Apr. 2, 2021, the disclosure of which is incorporated by reference herein in its entirety.

BACKGROUND OF THE INVENTION

1. Field of the Invention

The present disclosure in some embodiments relates to an electric booster brake apparatus and a control method thereof.

2. Discussion of Related Art

The statements in this section merely provide background information related to the present disclosure and do not necessarily constitute prior art.

An electric booster brake apparatus is a device that assists a driver in exerting the braking force by boosting the pedal effort by using an electric motor-based booster.

The electric booster brake apparatus includes an electric booster unit to boost the pedal stepping force by the driver. The electric booster unit uses the rotation torque of the electric motor provided therein to increase the force that the operating rod pressurizes the inside of the master cylinder. Additionally, the electric booster unit is configured to provide a required stepping force to the driver while the stepping force is established. Specifically, such configuration is provided that a reaction disc is depressed by the electric booster to establish an appropriate stepping force corresponding to the pedal stroke.

On the other hand, to improve the driving stability of the vehicle and secure the driver's convenience, recently launched vehicles more are equipped with various driver assistance systems. Driver assistance systems include an Adaptive Cruise Control (ACC), Automatic Vehicle Hold (AHB), Hill Assist Control (HAC), Hydraulic Brake Assist (HBA), Autonomous Emergency Braking (AEB), Remote Smart Parking Assist (RSPA), etc.

Conventionally, the driver assistance system as described above is configured to be implemented by using an Electronic Stability Control (ESC) for generating the hydraulic pressure which is then used to perform the deceleration control. Therefore, with such a configuration, to accurately follow the required braking pressure for braking requires an ESC operating unit of high specification.

Specifically, the conventional driver assistance system requires an additional pressure-reducing device such as an accumulator for precise reduction of the hydraulic pressure and further requires pressurizing devices such as a pump and a hydraulic valve for the precise increase of the hydraulic pressure, which causes a rise in specification and costs of the ESC operating unit. Those conventional driver assistance systems involve another issue of noise generated as the pump and the hydraulic valve operate to make the driver feel uncomfortable.

BRIEF SUMMARY OF THE INVENTION

According to at least one embodiment, the present disclosure provides an electric booster brake apparatus including an electric booster unit, an electronic stability control (ESC) operating unit, and an electric-booster control unit. The electric booster unit has a motor, a motor piston, and a master cylinder and is configured to pressurize the master cylinder containing a brake fluid by adjusting a displacement of the motor piston in a linear movement in response to a rotation of the motor. The ESC operating unit includes a pressure sensor for measuring pressure in the master cylinder and is configured to calculate a required braking pressure for the braking of a vehicle. The electric-booster control unit is configured to control the position of the motor piston upon receiving, from the ESC operating unit, a value that represents the required braking pressure and a value that represents the pressure in the master cylinder. Here, the electric-booster control unit includes a feedforward control unit configured to convert the value of the required braking pressure into a motor piston displacement, and a feedback control unit configured to calculate a compensation displacement of the motor piston based on a difference between the value of the required braking pressure and the value of the pressure in the master cylinder.

According to another embodiment, the present disclosure provides a method of controlling an electric booster brake apparatus by an electric booster unit and an electronic stability control (ESC) operating unit provided in a vehicle, the electric booster unit being configured to pressurize a master cylinder containing a brake fluid by adjusting a displacement of a motor piston in a linear movement in response to a rotation of a motor, the method including calculating, by the ESC operating unit, a required braking pressure for braking the vehicle and measuring, by the ESC operating unit, a pressure in the master cylinder, and receiving, by an electric-booster control unit controlling a position of the motor piston, a value that represents the required braking pressure and a value that represents the pressure in the master cylinder from the ESC operating unit, and converting, by the electric-booster control unit, the value of the required braking pressure into a conversion displacement of the motor piston, and calculating, by the electric-booster control unit, a compensation displacement of the motor piston based on a difference between the value of the required braking pressure and the value of the pressure in the master cylinder, and controlling the rotation of the motor by the electric-booster control unit to pressurize the master cylinder by moving the motor piston by a displacement that is obtained by adding the compensation displacement to the conversion displacement.

DETAILED DESCRIPTION OF THE INVENTION

Figure 1:
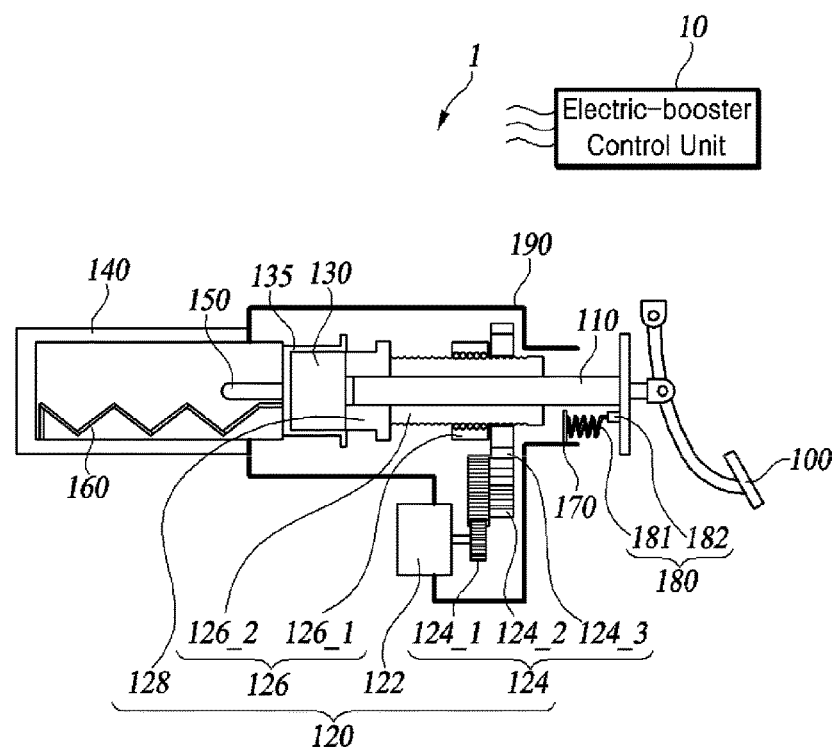
FIG. 1 is a cross-sectional view of a hydraulic-pressure forming unit of an electric booster brake apparatus according to at least one embodiment of the present disclosure.

Accordingly, for overcoming the aforementioned issues, the present disclosure seeks to provide an electric booster brake apparatus configured to render an electric booster to control a hydraulic pressure during hydraulic braking, thereby allowing an ESC operating unit to be used with lowered specification and cost while reducing noise due to the hydraulic control operation and to provide a method of controlling the electric booster brake apparatus.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

FIG. 1 is a cross-sectional view of a hydraulic-pressure forming unit of an electric booster brake apparatus according to at least one embodiment of the present disclosure.

Figure 2:
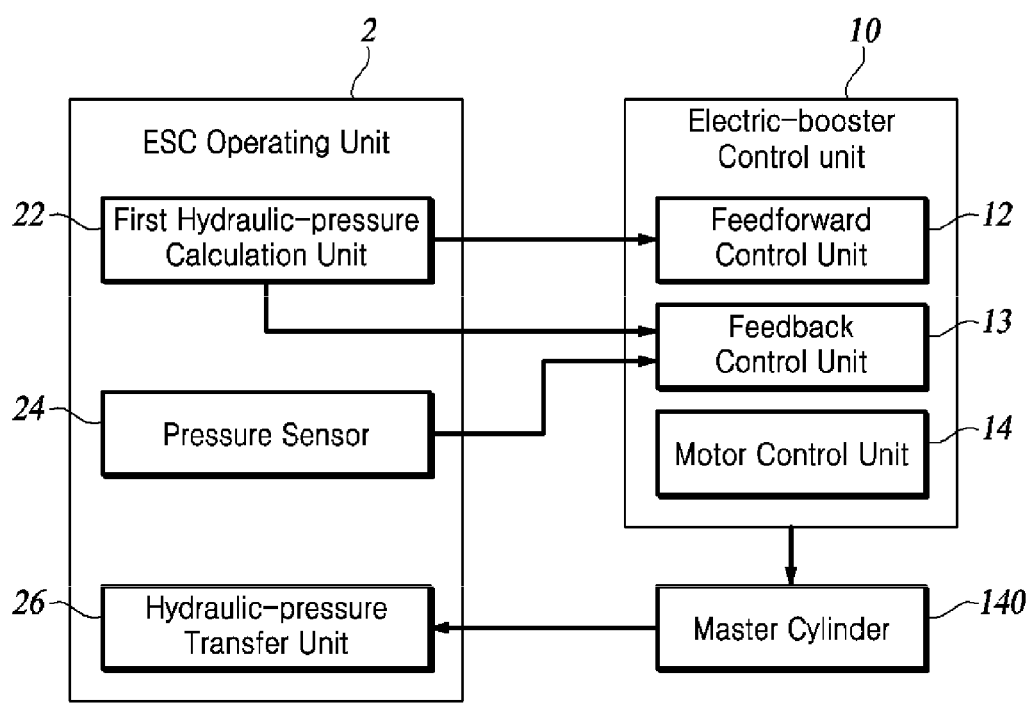
FIG. 2 is a diagram of the configuration of an electric booster brake apparatus according to at least one embodiment of the present disclosure.

FIG. 2 is a view showing the configuration of an electric booster brake apparatus according to at least one embodiment of the present disclosure.

As shown in FIGS. 1 and 2, the electric booster brake apparatus according to at least one embodiment includes all or some of a brake pedal 100, an operating rod 110, an electric booster unit 120, a reaction disc 130, a master cylinder 140, a push rod 150, a return spring 160, an electronic stability control or ESC operating unit 2, and an electric-booster control unit 10. All or some of these components constitute a hydraulic-pressure forming unit 1, i.e., all or some of the brake pedal 100, operating rod 110, electric booster unit 120, reaction disk 130, master cylinder 140, push rod 150, and return spring 160.

The brake pedal 100 is a part that the driver steps on for deceleration or stopping of the vehicle. When the driver steps on the brake pedal 100, the operating rod 110 may move in a direction in which the driver depresses the brake pedal 100. Meanwhile, the amount of travel or stroke of the brake pedal 100 may be measured by a separately provided pedal sensor (not shown).

The operating rod 110 is a medium for transmitting a stepping force according to the depression of the brake pedal 100 to the reaction disk 130 and configured to adjust the displacement of the brake pedal 100 depending on the amount of stroke of the brake pedal 100. The operating rod 110 has one end connected to the brake pedal 100 and the other end configured to abut the reaction disk 130. Therefore, when the driver steps on the brake pedal 100 to depress the operating rod 110 by a predetermined pressure or more, the operating rod 110 may move toward the reaction disk 130 to depress the same.

On the other hand, in the initial state in which the stepping on the brake pedal 100 begins, the operating rod 110 may be disposed to be spaced apart from the reaction disk 130 by a predetermined distance. In this case, the driver's stepping on the brake pedal 100 may yet to force the operating rod 110 to depress the reaction disk 130.

The electric booster unit 120 is configured to be driven by the rotation of the motor 122 to cause the motor piston 128 to move linearly for adjusting the displacement of the motor piston 128. As the displacement of the motor piston 128 is adjusted, the master cylinder 140 may be pressurized. To this end, the electric booster unit 120 may include a motor 122, a gear unit 124, a screw shaft 126, and the motor piston 128.

The motor 122 is configured to rotate around its axis in the forward direction or the opposite direction under the control of the electric-booster control unit 10.

The gear unit 124 is configured to transmit a rotation torque according to the rotational motion of the motor 122 to the screw shaft 126. To this end, the gear unit 124 may include a first gear 124_1, a second gear 124_2, and a third gear 124_3.

In this case, the first gear 124_1 primarily relays the rotational torque of the motor 122 to the second gear 124_2. The second gear 124_2 transmits the rotation torque received from the first gear 124_1 to the third gear 124_3. The third gear 124_3 relays the rotation torque from the second gear 124_2 to the screw shaft 126. Based on the ratio of the numbers of teeth of the first gear 124_1 to the third gear 124_3, the rotation speed may decrease or increase at a certain rate while the rotation torque is transmitted from the first gear 124_1 to the third gear 124_3.

The screw shaft 126 is configured to receive rotational torque from the gear unit 124 and convert the rotational motion into linear movement. To this end, the screw shaft 126 may include a first shaft 126_1 and a second shaft 126_2.

In this case, the first shaft 126_1 is constrained and rotated by the third gear 124_3, and the second shaft 126_2 is configured to convert the rotational motion of the first shaft 126_1 into linear movement. Preferably, the first shaft 126_1 may be a pinion, and the second shaft 126_2 may be a rack. Additionally, since one end of the second shaft 126_2 is coupled to the motor piston 128, as the motor 122 is driven, the motor piston 128 may move forward toward the reaction disk 130 or backward in the opposite direction.

Accordingly, the motor piston 128 may perform the linear movement, that is, forward or backward motion by the gear unit 124 and the screw shaft 126. In particular, when the motor piston 128 moves forward, it may depress the reaction disk 130, and accordingly, the master cylinder 140 may be pressurized.

The reaction disk 130 is configured to be depressed and moved following the displacement control of at least one of the operating rod 110 and the motor piston 128. In FIG. 1, the reaction disk 130 and the motor piston 128 are shown in contact with each other. However, when no braking is required, the motor piston 128 may be spaced apart from the reaction disk 130.

When the reaction disk 130 is depressed by at least one of the operating rod 110 and the motor piston 128, the reaction force formed by the force of depression is transmitted to the driver via the operating rod 110, which allows the driver to get the pedal feel.

Additionally, the reaction disk 130 may be configured to have its center depressed by the operating rod 110 and have its outer portions depressed by the motor piston 128. To this end, the vertical section of the motor piston 128 is configured to be of an annular type and has a central hollow portion (not shown) through which the operating rod 110 may penetrate. In this case, the operating rod 110 and the reaction disk 130 are preferably disposed coaxially.

On the other hand, the reaction disk 130 may be made of a compressible elastic material. For example, at least a portion of the reaction disk 130 may be formed of a rubber material. Accordingly, when the motor piston 128 depresses the reaction disk 130, the central portion of the reaction disk 130 may protrude toward the operating rod 110 according to the degree of depression.

Additionally, the electric booster brake apparatus according to at least one embodiment of the present disclosure may further include a reaction-disc accommodation unit 135 formed with an internal accommodation space for accommodating at least a portion of the reaction disk 130. The reaction-disc accommodation unit 135 may have one side formed with a push rod 150 adapted to advance in response to when the reaction disk 130 is depressed by at least one of the operating rod 110 and the motor piston 128 to advance.

The master cylinder 140 is configured to receive a brake fluid therein. As the brake fluid inside the master cylinder 140 is pressurized, hydraulic pressure used for braking the vehicle may be formed. At this time, the formed hydraulic pressure is transmitted through the ESC operating unit 2 to a plurality of wheel brakes 210, 220, 230, 240 (shown in FIG. 3).

The push rod 150 is configured to be responsive to the movement of the reaction disk 130 for pressurizing the master cylinder 140. To this end, at least a portion of the push rod 150 may be configured to be inserted into the master cylinder 140. In this case, the push rod 150 may reciprocate in the master cylinder 140 along the longitudinal direction thereof, and when the push rod 150 advances, the brake fluid stored inside of the master cylinder 140 may be pressurized.

The return spring 160 is disposed inside the master cylinder 140 and is compressed or expanded by the reciprocating motion of the push rod 150. The return spring 160 may be composed of, but is not limited to, a coil spring, and it may be composed of a plate spring or an elastic body such as rubber. When no hydraulic braking is performed, the return spring 160 may be used to return the reaction disk 130, the motor piston 128, the operating rod 110, and the brake pedal 100 to their original positions.

On the other hand, the electric booster brake apparatus according to at least one embodiment includes an elastic-body fixing unit 170 and an elastic body 180 for forming stepping force.

The elastic-body fixing unit 170 is fixed to a housing 190 of the hydraulic-pressure forming unit 1, and at least a part of the elastic body 180 is attached to one surface of the elastic-body fixing unit 170. The elastic-body fixing unit 170 is formed to support the elastic body 180 when the elastic body 180 is depressed by the driver's depression of the brake pedal 100.

The elastic body 180 is disposed so that one end is in contact with the operating rod 110 and the other end is in contact with the elastic-body fixing unit 170. The elastic body 180 forms an elastic force in response to the movement of the operating rod 110. The elastic body 180 may be composed of a spring 181, or it may be composed of a combination of the spring 181 and a damper 182. In FIG. 1, the spring 181 and the damper 182 are shown to be connected in series, but the present disclosure is not limited thereto, and the spring 181 and the damper 182 may be connected in parallel.

When the driver depresses the brake pedal 100, the operating rod 110 compresses the elastic body 180 while moving toward the reaction disk 130. Since the compressed elastic body 180 forms a reaction force by the name of an elastic force, it may feed the stepping force back to the driver. Therefore, even though the operating rod 110 is not in contact with the reaction disk 130 generating no reaction force from the reaction disk 130, a reaction force formed from the elastic body 180 may allow the driver to get the pedal feel. Additionally, since the elastic body 180 is connected to the elastic-body fixing unit 170, even while the pressure changes in the master cylinder 140, the driver may be saved from feeling irregularity in the pedal feel.

The ESC operating unit 2 is configured to calculate a required braking pressure for the braking of the vehicle. To this end, as shown in FIG. 2, the ESC operating unit 2 may include a first hydraulic-pressure calculation unit 22 for automatically calculating the required braking pressure according to the driving mode of the vehicle and transmitting the calculated value of the required braking pressure to the electric-booster control unit 10.

Here, the driving mode may mean modes of utilizing Adaptive Cruise Control (ACC), Automatic Vehicle Hold (AHB), Hill Assist Control (HAC), Hydraulic Brake Assist (HBA), Autonomous Emergency Braking (AEB), and Remote Smart Parking Assist (RSPA) among others.

To automatically calculate the required braking pressure, the first hydraulic-pressure calculation unit 22 may receive measured values from various sensors mounted on the vehicle. For example, values may be received corresponding to a measured vehicle speed from a vehicle speed sensor (not shown), a measured acceleration from an acceleration sensor (not shown), and a measured distance to an object from a radar (not shown). Therefore, the first hydraulic-pressure calculation unit 22 may utilize all or some of the above values to automatically calculate the required braking pressure when the vehicle needs to brake, for example, when a vehicle in front is detected and deceleration is required.

The ESC operating unit 2 may further include a pressure sensor 24 configured to measure the pressure of the master cylinder 140. The measured pressure value of the master cylinder 140 from the pressure sensor 24 may be transmitted to the electric-booster control unit 10.

The electric-booster control unit 10 controls the position of the motor piston 128 by receiving, from the ESC operating unit 2, values of the required braking pressure and the pressure of the master cylinder 140. For example, the electric-booster control unit 10 may receive a value of the required braking pressure from the first hydraulic-pressure calculation unit 22. The electric-booster control unit 10 may control the position of the motor piston 128 by controlling the rotation of the motor 122.

For the position control of the motor piston 128, the electric-booster control unit 10 may include a feedforward control unit 12, a feedback control unit 13, and a motor control unit 14.

The feedforward control unit 12 may convert a value of the required braking pressure into the displacement of the motor piston 128. Converting the displacement of the motor piston 128 with the required braking pressure value may use a calculation formula employing a dynamic model of the electric booster unit 120, empirically obtained calculation values, and the like. The following description is provided with the displacement of the motor piston 128 as converted by the feedforward control unit 12 being defined as a conversion displacement.

The feedback control unit 13 may calculate a compensation displacement of the motor piston 128 based on the difference between the required braking pressure value and the pressure value of the master cylinder 140. Not only the feedforward control unit 12 calculates the conversion displacement of the motor piston 128, but also the feedback control unit 13 calculates the compensation displacement of the motor piston 128, which allows the electric-booster control unit 10 to provide the calculated displacement of the motor piston 128, corresponding exactly to the required braking pressure.

The motor control unit 14 controls the motor 122 based on the conversion displacement plus the compensation displacement as the displacement value of the motor piston 128. In other words, the motor control unit 14 may control the rotation of the motor 122 so that the motor piston 128 moves by a displacement obtained by adding a compensation displacement to a conversion displacement. In this case, as the motor piston 128 moves, the master cylinder 140 may be pressurized.

Figure 3:
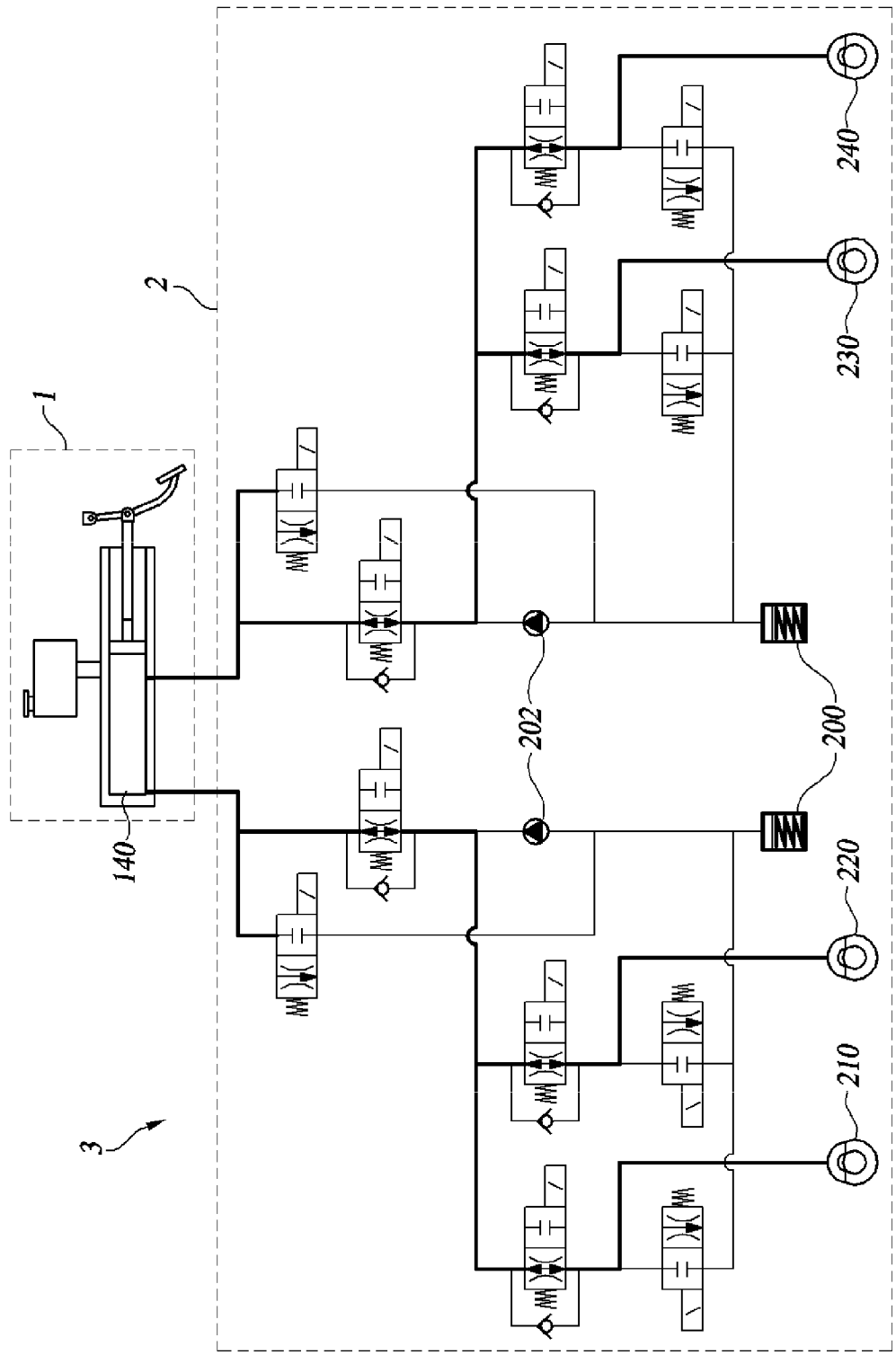
FIG. 3 is a diagram explaining that a braking pressure generated by an electric booster unit is supplied to a plurality of wheel brakes.

FIG. 3 is a diagram explaining that a braking pressure generated by the electric booster unit is supplied to a plurality of wheel brakes.

As shown in FIG. 3, the ESC operating unit 2 includes accumulators 200 for storing brake fluid and pumps 202 for pumping the brake fluid stored in the accumulators 200.

When the master cylinder 140 is pressurized as the motor piston 128 moves, the ESC operating unit 2 applies the braking pressure generated by pressurizing the master cylinder 140 to a plurality of wheel brakes 210, 220, 230, 240 of the vehicle. More specifically, the braking pressure may be transmitted to the plurality of wheel brakes 210, 220, 230, 240 by a hydraulic-pressure transfer unit 26 included in the ESC operating unit 2.

Since the conventional ESC operating units have to directly generate the braking pressure, they require costly pumps and valves to continuously meet the exact required braking pressure.

The electric booster brake apparatus according to the present disclosure is configured to control the position of the motor piston 128 by the electric-booster control unit 10 in implementing a driver assistance system, for example, an adaptive cruise control (ADC). In other words, the present disclosure obviates the need for the ESC operating unit 2 to calculate the displacement of the motor piston 128 or control the position of the motor piston 128 to form hydraulic pressure. Additionally, in the formation of the braking pressure, employing the motor 122 of the electric booster unit 120 is more advantageous in terms of responsiveness and accuracy than using the pump 202 and valves of the ESC operating unit 2. Therefore, even with pumps and valves of relatively low specification, the present electric booster brake apparatus can accurately follow the required braking pressure.

Additionally, the present electric booster brake apparatus can eliminate noise issues that may be generated with the ESC operating unit 2 directly driving the pumps 202 and the valves to form the braking pressure.

On the other hand, the electric booster brake apparatus 3 according to at least one embodiment of the present disclosure further includes a second hydraulic-pressure calculation unit (not shown) for calculating the required braking pressure according to the amount of stroke of the brake pedal 100 and transmitting the calculated value of the required braking pressure to the electric-booster control unit 10. This is to satisfy the braking force required by the driver.

The second hydraulic-pressure calculation unit may be configured separately from the ESC operating unit 2 and the electric-booster control unit 10. For example, the second hydraulic-pressure calculation unit may be configured to be electrically connected to the pedal sensor.

Additionally, the electric-booster control unit 10 may receive the required braking pressure value from the first hydraulic-pressure calculation unit 22 and the second hydraulic-pressure calculation unit. More specifically, the feedforward control unit 12 and the feedback control unit 13 may receive the required braking pressure value from the first hydraulic-pressure calculation unit 22 and the second hydraulic-pressure calculation unit.

In this case, the feedforward control unit 12 may convert the required braking pressure value that is calculated by the first hydraulic-pressure calculation unit 22 or the required braking pressure value that is calculated by the second hydraulic-pressure calculation unit to the displacement of the motor piston 128. Likewise, the feedback control unit 13 may also compensate for the difference between the required braking pressure value calculated by the first hydraulic-pressure calculation unit 22 or the required braking pressure value calculated by the second hydraulic-pressure calculation unit and the pressure of the master cylinder 140 to calculate the displacement of the motor piston 128.

Whether to use the required braking pressure calculated by any hydraulic-pressure calculation unit may be determined in consideration of the driving mode, the magnitude of the required dynamic pressure, and the like. However, the present disclosure is not necessarily limited to using the required braking pressure value calculated by the first hydraulic-pressure calculation unit 22 or the required braking pressure value calculated by the second hydraulic-pressure calculation unit.

For example, the present disclosure can calculate a new required braking pressure by considering both the required braking pressure calculated by the first hydraulic-pressure calculation unit 22 and the required braking pressure calculated by the second hydraulic-pressure calculation unit. In this case, a weight may be applied to the required braking pressure calculated by the first hydraulic-pressure calculation unit 22 and the required braking pressure calculated by the second hydraulic-pressure calculation unit.

Figure 4:
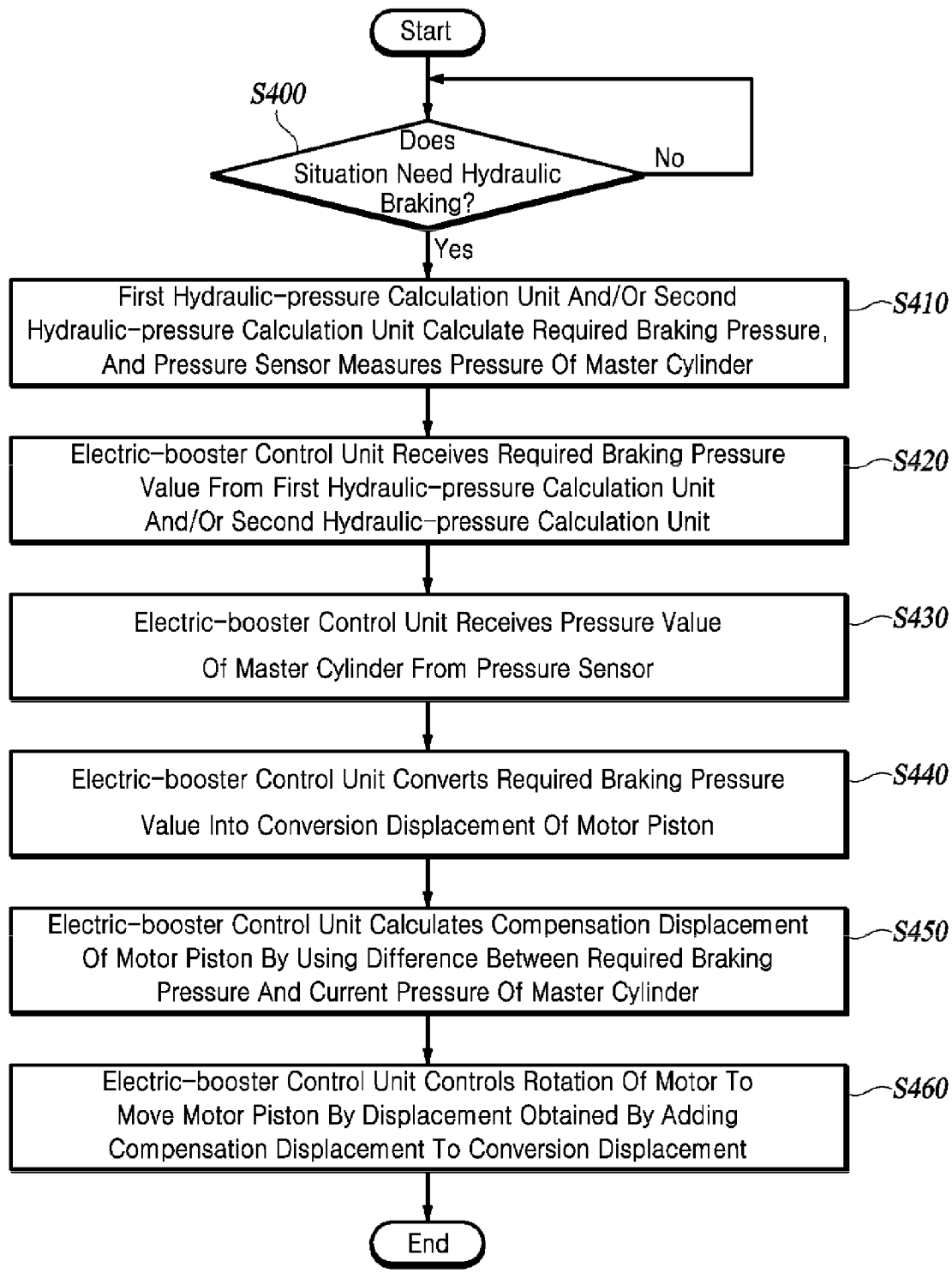
FIG. 4 is a flowchart of a method of controlling an electric booster brake apparatus, according to at least one embodiment of the present disclosure.

FIG. 4 is a flowchart of a method of controlling an electric booster brake apparatus, according to at least one embodiment of the present disclosure.

As shown in FIG. 4, the electric booster unit 120 in the hydraulic-pressure forming unit 1 and the ESC operating unit 2 may cooperate to control the electric booster brake apparatus according to at least one embodiment of the present disclosure.

The ESC operating unit 2 determines whether or not the situation needs hydraulic braking (S400). Upon determining that no hydraulic braking is needed, the ESC operating unit 2 does not proceed with the subsequent process and continues to determine whether or not the situation needs hydraulic braking.

Upon determining that the situation needs hydraulic braking, the ESC operating unit 2 calculates the required braking pressure and measures the pressure of the master cylinder 140. More specifically, the first hydraulic-pressure calculation unit 22 calculates the required braking pressure for hydraulic braking, and the pressure sensor 24 measures the pressure of the master cylinder 140. Meanwhile, not only the first hydraulic-pressure calculation unit 22 but also the second hydraulic-pressure calculation unit may calculate the required braking pressure for hydraulic braking. The first hydraulic-pressure calculation unit 22 and/or the second hydraulic-pressure calculation unit calculates the required braking pressure, and the pressure sensor 24 measures the pressure of the master cylinder 140 (S410). Since the description of the calculation of the required braking pressure has been described above, a detailed description thereof is omitted here.

The electric-booster control unit 10 may receive values of the required braking pressure and the pressure of the master cylinder 140. In more detail, the electric-booster control unit 10 may receive the required braking pressure from the first hydraulic-pressure calculation unit 22. When the second hydraulic-pressure calculation unit also has the required braking pressure calculated, the electric-booster control unit 10 may additionally receive the required braking pressure value from the second hydraulic-pressure calculation unit. The electric-booster control unit 10 receives the required braking pressure value from the first hydraulic-pressure calculation unit 22 and/or the second hydraulic-pressure calculation unit (S420).

Additionally, the electric-booster control unit 10 receives the current pressure value of the master cylinder 140 from the pressure sensor 24 (S430). In FIG. 4, Step S430 is shown to be performed after Step S420, which is not limitive of the disclosure, and Step S430 may be performed before Step S420, or Steps S420 and S430 may be performed simultaneously.

The electric-booster control unit 10 in receipt of the required braking pressure value converts the same into a conversion displacement of the motor piston 128 (S440). In more detail, the conversion displacement of the motor piston 128 may be calculated by the feedforward control unit 12 included in the electric-booster control unit 10.

Upon receiving the values of the required braking pressure from the first hydraulic-pressure calculation unit 22 and the second hydraulic-pressure calculation unit, the electric-booster control unit 10 may convert the required braking pressure value(s) into a displacement of the motor piston 128.

Additionally, the electric-booster control unit 10 calculates a compensation displacement of the motor piston 128 based on the difference between the required braking pressure value and the pressure value of the master cylinder 140 (S450). In more detail, the compensation displacement of the motor piston 128 may be calculated by the feedback control unit 13 included in the electric-booster control unit 10.

Upon receiving the values of the required braking pressure from the first hydraulic-pressure calculation unit 22 and the second hydraulic-pressure calculation unit, the electric-booster control unit 10 may also calculate a compensation displacement of the motor piston 128 based on the difference between the required braking pressure value from the first hydraulic-pressure calculation unit 22 and/or the required braking pressure value from the second hydraulic-pressure calculation unit and the pressure value of the master cylinder 140.

The above description covers the operation of the electric-booster control unit 10 about whether or not it uses the required braking pressure from which hydraulic-pressure calculation unit to calculate the conversion displacement and the compensation displacement of the motor piston 128, and a detailed description thereof will be omitted herein.

The electric-booster control unit 10 controls the rotation of the motor 122 so that the motor piston 128 moves as much as the displacement obtained by adding the compensation displacement to the conversion displacement and thereby pressurizes the master cylinder 140 (S460). As the master cylinder 140 is pressurized, a braking pressure required for braking may be generated. The ESC operating unit 2 may supply the generated braking pressure to the plurality of wheel brakes 210, 220, 230, and 240.

The control method of the electric booster brake apparatus, according to at least one embodiment of the present disclosure includes the above steps, and thus, in implementing a driver assistance system, such as adaptive cruise control (ADC), the electric-booster control unit 10 can control the position of the motor piston 128. Through the arrangement establishing the braking pressure with the electric booster unit 120, the electric booster brake apparatus and the control method thereof as disclosed by some embodiments can lower the specification and cost of the ESC operating unit 2 and reduce noise produced by hydraulic control.

As described above, according to some embodiments of the present disclosure, the electric booster is configured to control the hydraulic pressure during hydraulic braking, thereby lowering the specification and cost of the ESC operating unit and reducing noise due to hydraulic control.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electric booster brake apparatus, comprising:
an electric booster unit comprising a motor, a motor piston, and a master cylinder and configured to adjust a displacement of the motor piston in a linear movement in response to a rotation of the motor to pressurize the master cylinder containing a brake fluid;
an electronic stability control (ESC) operating unit configured to calculate a braking pressure required for braking of a vehicle, and comprising a pressure sensor configured to measure a pressure in the master cylinder; and
an electric-booster control unit configured to receive a first value and a second value from the ESC operating unit, the first value being indicative of the required braking pressure and the second value being indicative of the pressure in the master cylinder, the electric-booster control unit being configured to control a position of the motor piston based on a motor piston displacement and a compensation displacement which are derived from the first value and the second value,
wherein the electric-booster control unit comprises:
a feedforward control unit configured to convert the first value into the motor piston displacement; and
a feedback control unit configured to calculate the compensation displacement of the motor piston based on a difference between the first and second values.

2. The electric booster brake apparatus of claim 1, wherein the electric-booster control unit further comprises a motor control unit configured to control the motor based on a motor piston displacement value obtained by adding the compensation displacement of the motor piston to the motor piston displacement.

3. The electric booster brake apparatus of claim 1, wherein the ESC operating unit further comprises a first hydraulic-pressure calculation configured to calculate the required braking pressure according to a driving mode of the vehicle and to transmit the calculated required braking pressure to the electric-booster control unit.

4. The electric booster brake apparatus of claim 3, further comprising a second hydraulic-pressure calculation unit configured to calculate, based on an amount of stroke applied to a brake pedal, the required braking pressure and to transmit the calculated required braking pressure to the electric-booster control unit, wherein the feedforward control unit is further configured to convert the calculated required braking pressure from the first hydraulic-pressure calculation unit or the second hydraulic-pressure calculation unit into the displacement of the motor piston, and the feedback control unit is further configured to calculate the compensation displacement of the motor piston based on the calculated required braking pressure or a difference between the calculated required braking pressure and the measured pressure in the master cylinder.

5. The electric booster brake apparatus of claim 1, wherein the ESC operating unit is further configured to supply, to a wheel brake of the vehicle, a braking pressure generated by the pressurized master cylinder.

6. The electric booster brake apparatus of claim 1, wherein the electric booster unit further comprises:

an operating rod configured to adjust a displacement thereof in response to an amount of stroke applied to a brake pedal; and a reaction disc configured to be pressurized and moved in response to at least one of the adjusted displacement of the operating rod and the motor piston displacement.

7. The electric booster brake apparatus of claim 6, wherein the reaction disk is made of an elastic material and has a center arranged to be pressurized by the operating rod and a periphery arranged to be pressurized by the motor piston.

8. The electric booster brake apparatus of claim 1, further comprising:

a gear unit configured to transmit a rotation torque produced by a rotational movement of the motor; and a screw shaft configured to receive the rotational torque from the gear unit and convert the rotational movement into a linear movement, wherein the motor piston is configured to move linearly when driven by the gear unit and the screw shaft.

9. A method of controlling braking of a vehicle, comprising:

calculating a braking pressure required for braking the vehicle;

measuring a pressure in a master cylinder;

generating a first value indicative of the required braking pressure and a second value indicative of the measured pressure in the master cylinder;

converting the first value into a conversion displacement of a motor piston;

calculating a compensation displacement of the motor piston based on a difference between the first and second values; and controlling a rotation of a motor to pressurize the master cylinder by moving the motor piston based on a displacement obtained by adding the compensation displacement to the conversion displacement.

10. The method of claim 9, wherein generating the first and second values comprises calculating the required braking pressure based on a driving mode of the vehicle.

11. The method of claim 10, wherein:

generating the first value comprises calculating the required braking pressure based on an amount of stroke applied to a brake pedal, converting the first value into the conversion displacement of the motor piston and calculating the compensation displacement of the motor piston are performed based on the required braking pressure calculated based on the driving mode of the vehicle or the amount of stroke applied to the brake pedal.

12. The method of claim 9, further comprising supplying, to a wheel brake of the vehicle, a braking pressure generated by the pressured master cylinder.

* * * * *